Figure 1:
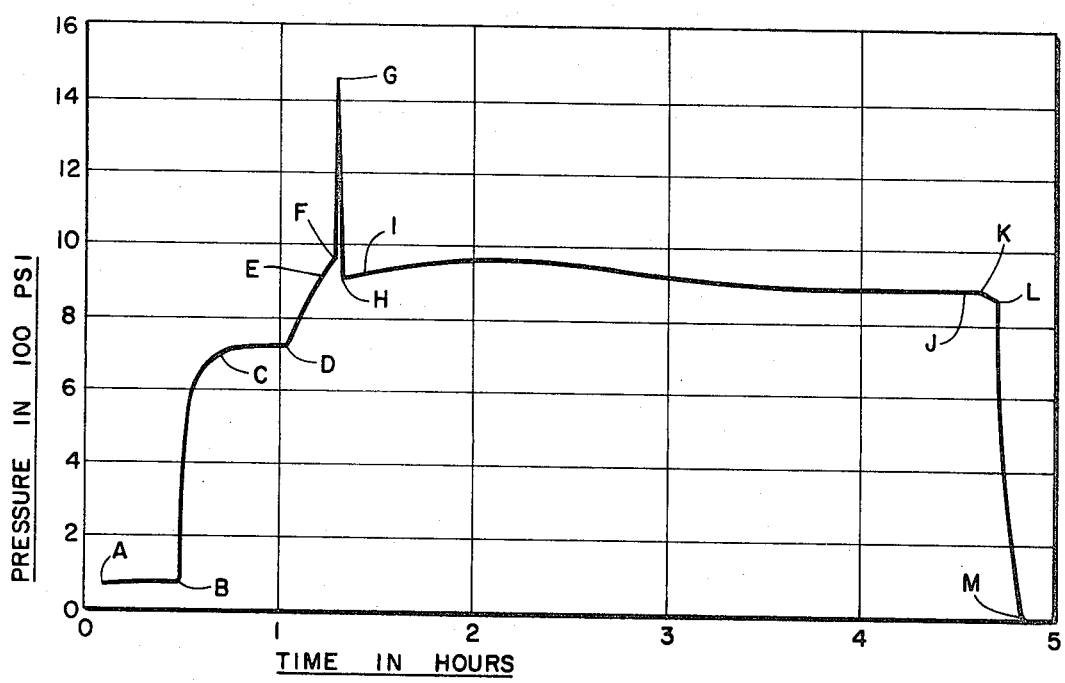

Sept. 4, 1973   D. PILIPOVICH ET AL   3,756,780

PREPARATION OF CHLORINE PENTAFLUORIDE

Filed Sept. 30, 1963

INVENTORS
DONALD PILIPOVICH
BY WALTER MAYA
RICHARD D. WILSON

ATTORNEY

3,756,780
PREPARATION OF CHLORINE PENTAFLUORIDE
Donald Pilipovich, Canoga Park, Walter Maya, Los Angeles, and Richard D. Wilson, Canoga Park, Calif., assignors to North American Rockwell Corporation
Filed Sept. 30, 1963, Ser. No. 313,410
Int. Cl. C01b 7/24, 9/08
U.S. Cl. 423—466                               5 Claims This invention relates to a process for preparation of chlorine pentafluoride ($ClF_5$) by reaction of fluorine with at least one member of the group consisting of chlorine, chlorine monofluoride (ClF) and chlorine trifluoride ($ClF_3$).

A method for the preparation of chlorine pentafluoride by subjecting a mixture of fluorine and chlorine, for example, to a glow discharge is described in patent application, Ser. No. 253,521, now Pat. No. 3,354,646, filed Jan. 21, 1963 by Walter Maya and Hans F. Bauer. As therein mentioned, chlorine pentafluoride is an extremely high-energy oxidizer of greater oxidizing potential than chlorine trifluoride which finds utility as an oxidizer for rocket propellant fuels. Also, the pentafluoride is useful as a fluorinating agent, e.g. for fluorinating olefins and inorganic salts. Its boiling point is about $-14°$ C.

Chlorine monofluoride is commercially produced by reaction of fluorine and chlorine at atmospheric or slightly above atmospheric pressure and at a preferred temperature of about 200° C. For the commercial production of the trifluoride, the monofluoride is reacted with fluorine at atmospheric or slightly above atmospheric pressure and at preferred temperatures in the range of from about 200° to 280° C. These reactions are exothermic. At temperatures above 400° C. severe corrosion of the reaction vessels (e.g. stainless steel, Monel metal) occurs. Also, at temperatures significantly above 400° C. the passive fluoride films on the reaction vessels are expected to either decompose or volatilize thus presenting "fresh" metal for corrosion.

By this invention complete fluorination of chlorine, chlorine monofluoride and (or) chlorine trifluoride to form the pentafluoride is accomplished by heating the fluorination reactants to a temperature of from about 100° to 400° C. (preferably from 100° to 280° C.) and by compressing the reactants to at least about 100 p.s.i., and preferably to at least 330 p.s.i. until an economical yield of pentafluoride is formed. The chemical reactions of the process of this invention are represented by the following equations:

$$Cl_2 + 5F_2 \rightarrow 2ClF_5 \qquad (1)$$
$$ClF + 2F_2 \rightarrow ClF_5 \qquad (2)$$
$$ClF_3 + F_2 \rightarrow ClF_5 \qquad (3)$$

Considering the changes in the number of moles of reactants and products involved in the above equations, it is manifest, as deduced from the LeChatelier-Braun principle, that an increase in pressure will cause an increase in yield of $ClF_5$ for each of the equations. Therefore, pressures of 20,000 p.s.i., for example, would result in a more facile production of $ClF_5$ than 1,000 p.s.i., for example.

The yields of the pentafluoride by the process of this invention are relatively high, the equipment and operations for its production are simple, and concomitantly, the costs of production are low.

The operations of the process of this invention, i.e. mixing, heating and compressing the reactants may be performed simultaneously or separately in any succession. With stoichiometric proportions of the reactants: when the reactants are fluorine and chlorine, the mono, tri and penta chlorine fluorides are formed; when the reactants are fluorine and the monofluoride, the tri and the penta chlorine fluorides are formed, and when the reactants are fluorine and the trifluoride, the pentafluoride is formed.

The yield of the pentafluoride, based on the chlorine or chlorine-containing reactants, is increased by using an excess of fluorine. When the process of this invention is performed in a batch procedure, as is convenient for laboratory operations, the use of about twice the stoichiometrical quantity of fluorine provides improved yields of the pentafluoride, but the use of about three times the stoichiometrical quantity of fluorine does not result in a sufficient increase in yield to justify the inconvenience of handling the increased excess of fluorine.

Inert gases, e.g. nitrogen and helium, may be mixed with the reactants without affecting the qualitative aspects of the reactions of this invention.

When the reactions of this invention are performed in batch operations, though the reactions occur when the pressure and temperature conditions referred to above are reached, reaction times of up to about 20 hours provide appreciable yields; however, reaction times of up to about 5 hours provide results of practical value. Reaction times in the range of even one minute provide significant yields when the reactants are preheated before mixing and are compressed to at least the minimum pressure hereinbefore mentioned.

Impurity traces of water or other oxygen containing compounds in the reactants cause formation of $FClO_2$ and $ClO_2$ as contaminants.

The invention is hereinafter illustrated in greater detail by description in connection with the following specific examples of the practice of it:

EXAMPLE 1

Into a 300 ml. bomb of Monel metal, cooled by immersion in a liquid nitrogen bath, there was condensed 2 liters of gaseous chlorine and 18 liters of gaseous fluorine. The bomb was then heated and maintained at a temperature of 100° C. (taken upon the outside surface of the bomb) for 17 hours, and without interruption was heated and maintained at a temperature of 200° C. for 5 hours. The bomb was then immersed in a bath of liquid nitrogen and the excess fluorine was pumped off. A second bomb of 300 ml. capacity and containing 15 grams of cesium fluoride for absorption of chlorine trifluoride was connected to the first mentioned bomb. The liquid nitrogen bath was transferred from the first to the second bomb whereby the contents of the first bomb passed into the second bomb. The second bomb was allowed to stand at room temperature overnight. Thereafter, its contents were analyzed and were found to contain 14.0 grams (2.4 liters as a gas) of chlorine pentafluoride of better than 98 percent purity, the yield of which was calculated to be 60 percent based on the weight of chlorine initially present in the first bomb.

EXAMPLE 2

The same technique as that described in Example 1 was followed with the exceptions that one liter of gaseous chlorine trifluoride and 9 liters of fluorine were used as the reactants; the bomb was maintained at a temperature of 200° C. for 16 hours, and the yield of chlorine pentafluoride was determined to be 70 percent.

EXAMPLES 3 to 8

Figure 2:
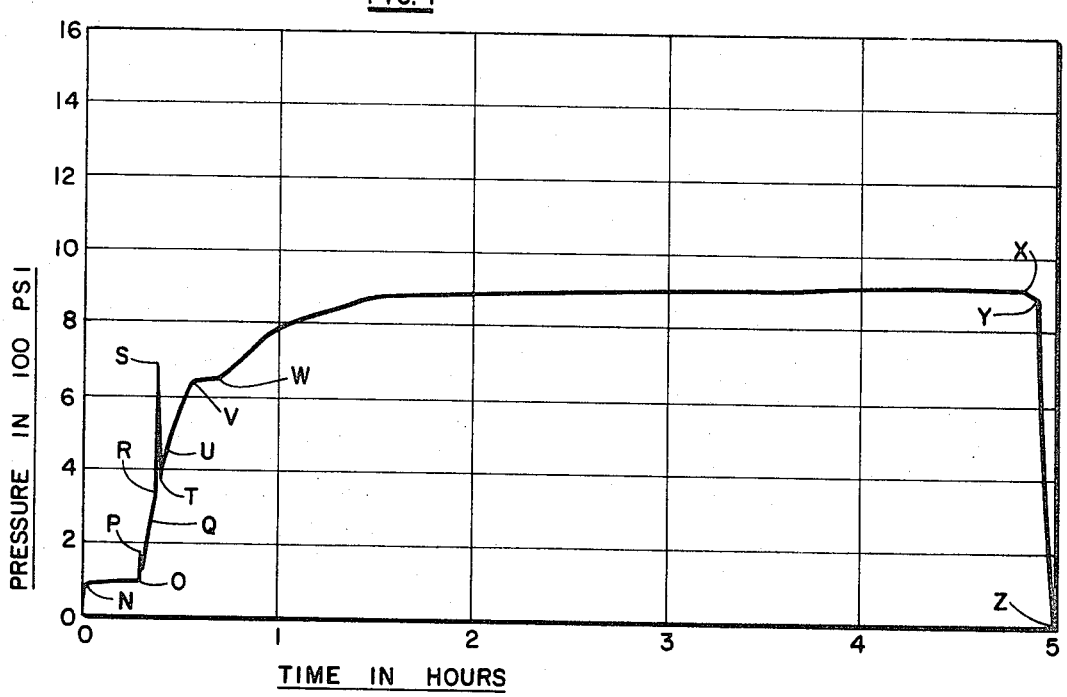

The operations for these further examples are hereinafter described with reference to the accompanying drawing wherein FIGS. 1 and 2 are graphs of rectangular coordinates translated from a circular chart on which pressure-time curves were traced by a recording instrument in response to the pressures experienced throughout the performance of Examples 3 and 4 respectively.

A high pressure cylinder of 3,000 cc. capacity was used as a reactor. It was encircled by a heating tape and it was equipped with instruments for continuous recording of inside temperature and pressure. With the reactor being at room temperature, its inside pressure was reduced to one-half atmosphere. The pressure recorder was turned on and then a measured amount of chlorine was passed into the reactor whereby the pressure inside the reactor reached point A in FIG. 1. Thereafter, throughout the time period represented by the distance along the time coordinate of FIG. 1 between points B and C, a measured amount of gaseous fluorine was passed into the reactor. At the time of point D the heating tape was energized. Between the time periods of points E to I and points J to L, the chart of the temperature recorder was actuated for the recording of temperature graphs. At point K the heating tape was de-energized. Starting at point L the contents of the reactor was transferred to a bomb whereupon the pressure in the reactor dropped to point M.

Within about twenty minutes after transfer of the contents of the reactor to the bomb (i.e. before permitting appreciable cooling of the reactor), the pressure in the reactor was reduced to one-half atmosphere and a measured amount of chlorine was passed into the reactor causing an increase in pressure to point N in FIG. 2. At point O in FIG. 2, introduction of a measured amount of fluorine was initiated. Between points Q and U and points X and Y the chart of the temperature recorder was actuated. At point V loading with gaseous fluorine was completed. At point W, the heating tape was energized and at point X it was de-energized. Transfer of the contents of the reactor to the bomb was initiated and completed at points Y and Z respectively. The contents of the bomb was analyzed by gas chromatography and infrared spectrum procedures. The chlorine pentafluoride in the bomb was separated from the other constituents of the contents of the bomb by conventional fractional distillation procedures.

The following table (Table I) sets forth particulars of operating conditions and results for Examples 3 to 8.

TABLE I

| | Example number | | | | | |
|---|---|---|---|---|---|---|
| | 3 | 4 | 5 | 6 | 7 | 8 |
| Procedure | Fig. 1 | Fig. 2 | Fig. 2 | Fig. 1 | Fig. 1 | Fig. 2 |
| $Cl_2$ in ml. (liquid) | 30 | 30 | 40 | 40 | 30 | 40 |
| $F_2$ in ml. (liquid) | 180 | 180 | 180 | 180 | 180 | 180 |
| Pressures in p.s.i.: | | | | | | |
| Point D | 730 | | | 760 | 720 | |
| Point F | 940 | | | 980 | 1020 | |
| Point G | 1450 | | | 1560 | 1410 | |
| Point H | 920 | | | 890 | 950 | |
| Point K | 880 | | | | 895 | |
| Point W | | 640 | 700 | | | 690 |
| Point R | | | 200 | | | 200 |
| Point S | | 690 | 540 | | | 430 |
| Point T | | 360 | 260 | | | 220 |
| Point X | | 920 | 900 | | | 870 |
| Temperatures in ° C.: | | | | | | |
| Point F | 112 | | | 112 | 139 | |
| Point G | 232 | | | 254 | 274 | |
| Point H | 140 | | | 140 | 154 | |
| Point K | 202 | | | 206 | 219 | |
| Point R | | | 41 | | | 44 |
| Point S | | 266 | 235 | | | 217 |
| Point T | | 84 | 49 | | | 52 |
| Point X | | 212 | 206 | | | 206 |
| | Ex. 3-4 comb. | | Ex. 5-6 comb. | | | |
| Weight of product, g | 299 | | 364 | | 151 | 170 |
| Percent yield: | | | | | | |
| $ClF_5$ | 66.2 | | 60 | | 75.5 | 48 |
| $ClF_3$ | 32.2 | | 38 | | 21.5 | 51 |
| $ClF$ | 0.6 | | 0.4 | | 0.8 | 0.5 |
| $F_2$ and $N_2$ | 0.2 | | 0.2 | | 0.4 | 0.2 |
| $Cl_2$ | 0.8 | | 0.7 | | 1.5 | 0.8 |

EXAMPLES 9 to 12

For these further examples, the procedure of Example 1 was followed with the exception that a pressure gage was connected to the first bomb. The following table (Table II) sets forth the operating conditions and results for these examples:

TABLE II

| | Example number | | | |
|---|---|---|---|---|
| | 9 | 10 | 11 | 12 |
| $Cl_2$ in liters (gas) | 2 | 3 | 3 | 1.5 |
| $F_2$ in liters (gas) | 18 | 27 | 27 | 21 |
| Temperature in ° C. at point corresponding to F in Fig. 1 | 125 | 200 | 120 | 115 |
| Pressure in p.s.i. at point corresponding to F in Fig. 1 | 880 | 1,560 | 1,300 | 1,120 |
| Temp. in ° C. at point corresponding to H in Fig. 1 | 140 | 220 | 110 | 145 |
| Pressure in p.s.i. at point corresponding to H in Fig. 1 | 740 | 1,410 | 1,190 | 1,020 |
| Highest temp. observed in ° C. | 250 | 270 | 270 | 185 |
| Pressure in p.s.i. at point of highest temperature | 900 | 1,445 | 1,410 | 1,130 |
| Heating time in hours | 3.3 | 2.7 | 1.5 | 3.5 |
| Percent yield of $ClF_5$ | 40 | 57 | 50 | 15.7 |

EXAMPLES 13 to 18

For these further examples, the procedures of Examples 1 or 2 (as hereinafter indicated) were followed and the operating conditions and results are set forth in the following table:

TABLE III

| | Example number | | | | | |
|---|---|---|---|---|---|---|
| | 13 | 14 | 15 | 16 | 17 | 18 |
| $Cl_2$ in liters (gas) | 1.8 | 1 | 2 | | | |
| $ClF_3$ in liters (gas) | | | | 1 | 0.5 | 1.6 |
| $F_2$ in liters (gas) | 18 | 9 | 18 | 18 | 4.5 | 18 |
| Final temperature in ° C. | 200 | 200 | 200 | 200 | 200 | 265 |
| Time of reaction (hrs.) | 21.5 | 19 | 20 | 21.5 | 18 | 3.6 |
| Calculated maximum pressure in p.s.i. | 850 | 425 | 850 | 1,250 | 330 | [1] 1,280 |
| Percent yield of $ClF_5$ | 63 | 16 | 67 | 60 | 37 | 53 |

[1] Observed.

Referring again to the graph of FIG. 1, the sharp rise in pressure from point F to G is apparently due to the occurrence of exothermic reactions, and the immediate sharp drop from point G to H is apparently due to reduction in the number of molecules in the reactor on account of formation of chlorine fluorides. Also, the pressure in the reactor is substantially lower at the point H, which marks the end of the pressure peak, than at the point F which marks the beginning of the pressure peak. It is of interest to note furthermore that though the temperature inside the reactor increased over the reaction period beginning at point H and ending at point K (as appears in Table I) the pressure in the reactor decreased slightly, which phenomenon is apparently due to reduction in number of molecules because of formation of chlorine pentafluoride.

In the graph of FIG. 2 there are two sharp pressure peaks to points P and S respectively which occurred during the time of addition of fluorine and before the heater was energized. These peaks are apparently due to exothermic formation of the mono and tri chlorine fluorides respectively, with the drops in pressure from the tips of the peaks being due to reduction in the number of molecules in the reactor. It is important to note that for FIG. 2 the reactor was in a heated condition at the beginning of the operation and the retained heat in the walls of the reactor was apparently sufficient to initiate formation of the lower fluorides. It is furthermore noteworthy that no sharp pressure peak was experienced subsequent to heating of the reactor at point W, and, as in the case of FIG. 1, the pressure in the reactor did not rise significantly throughout the last three hours of the period of the reaction, though the temperature did rise.

The observed gage pressures for the examples set forth in Table II were found to be about half their respective theoretical pressures of the mixtures of reactants at the respective highest temperatures listed, due apparently to formation of chlorine fluorides before attainment of the listed highest temperatures. On the basis of that observed phenomenon, the pressures listed for Examples 13, 14 and 15 in Table III were calculated as being one-half their respective theoretical pressures. On the same basis, the calculated pressures for Example 1 is 850 p.s.i. The observed pressure of Example 18 (Table III) using $ClF_3$ as a reactant, was found to be about 75 percent of the theoretical pressure for that example; accordingly the pressures set forth in Table III for Examples 16 and 17 are the results of calculations on the basis of 75 percent of these respective theoretical pressures.

It will be understood that it is intended to cover all changes and modifications of the examples of the invention herein chosen for the purposes of this disclosure, which do not constitute departures from the spirit and scope of the invention.

Having described the invention, what is claimed is:

1. A process for preparing chlorine pentafluoride comprising the steps of mixing fluorine with at least one member of the group consisting of chlorine, chlorine monofluoride and chlorine trifluoride under temperature and pressure conditions such that a temperature of from about 100° to about 400° C. and a pressure of at least 100 p.s.i. are reached, whereupon chlorine pentafluoride is formed.

2. The process of claim 1 in which said one member is chlorine.

3. The process of claim 1 in which said one member is chlorine trifluoride.

4. The process of claim 1 in which fluorine is mixed with at least one member of the group consisting of chlorine, chlorine monofluoride and chlorine trifluoride in from one to three times the stoichiometrical ratio for the formation of chlorine pentafluoride.

5. A process for preparing chlorine pentafluoride comprising the steps of introducing a sufficient amount of fluorine and at least one member of the group consisting of chlorine, chlorine monofluoride and chlorine trifluoride into a reactor such that the pressure in the reactor when heated to a temperature of from about 100° C. to about 280° C. will reach at least 330 p.s.i.; closing the reactor; heating the reactor to said temperature, whereby chlorine pentafluoride is formed, and recovering the chlorine pentafluoride so formed.

References Cited
UNITED STATES PATENTS 3,354,646   11/1967   Maya et al. _____ 23—205

CARL D. QUARFORTH, Primary Examiner

F. M. GITTES, Assistant Examiner

U.S. Cl. X.R.

149—1